July 9, 1963     C. A. AMANN ETAL     3,096,728
HIGH SPEED LAND TRANSPORTATION SYSTEM AND VEHICLE THEREFOR
Filed May 1, 1961     2 Sheets-Sheet 1
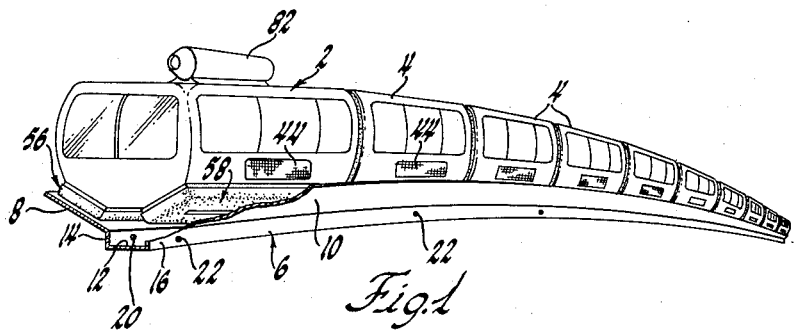
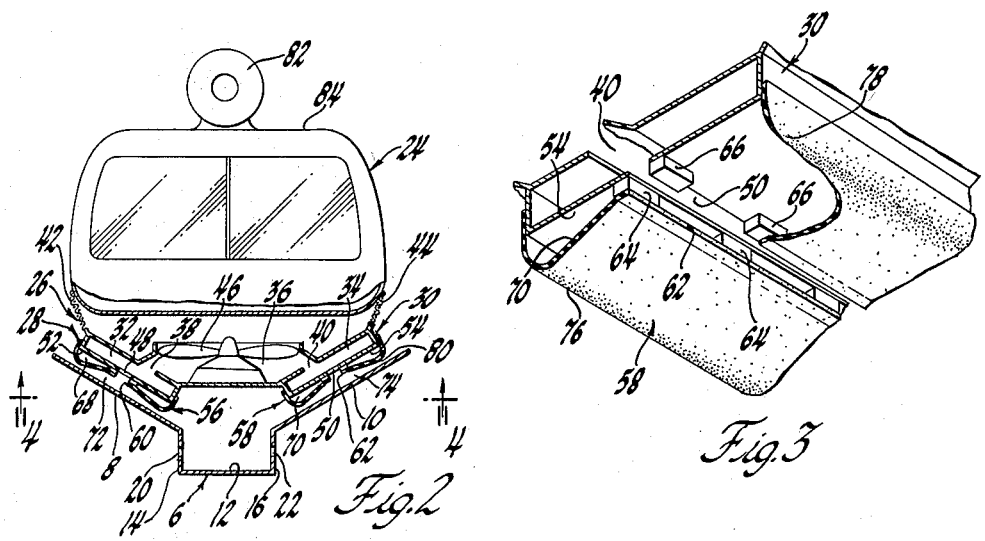
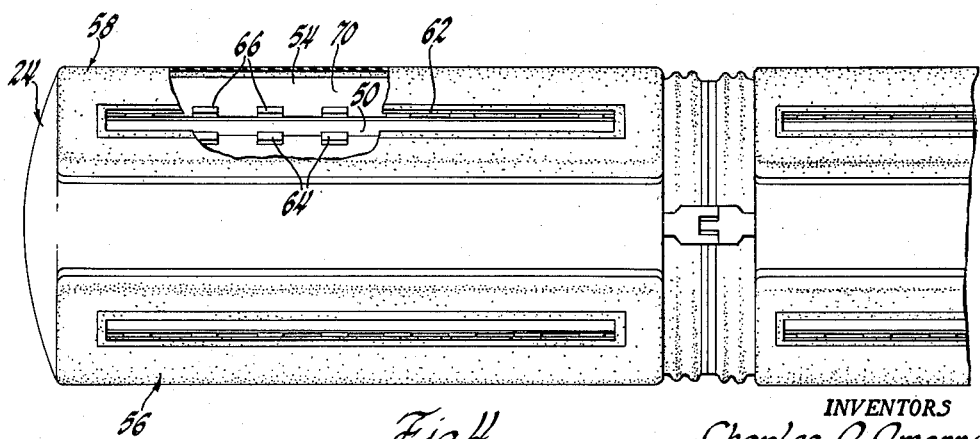
INVENTORS
Charles A. Amann &
BY Jerold W. Scheel
W. F. Wagner
ATTORNEY

United States Patent Office 3,096,728
Patented July 9, 1963

3,096,728
HIGH SPEED LAND TRANSPORTATION SYSTEM AND VEHICLE THEREFOR
Charles A. Amann, Birmingham, and Jerold W. Scheel, Detroit, Mich., assignors to General Motors Corporation, Detroit, Mich., a corporation of Delaware
Filed May 1, 1961, Ser. No. 106,561
14 Claims. (Cl. 104—134)

This invention relates to ground effect supported high speed land vehicles and guiding means therefor.

Numerous proposals have been advanced in the past aimed at providing ultra-high speed land transportation, most notable among which is the so-called monorail train in which one or more vehicles are suspended on a single continuous elevated guide rail along which the vehicle is propelled. In general, such arrangements utilized wheels, roller bearings, ball bearings, or other mechanical means, which reduce but do not entirely eliminate rolling friction. This residual friction must therefore be overcome in propelling the vehicle along the guiding track. More recently, it has also been proposed to provide vehicles or trains with shoes which overlie or partially envelop one or more rails either below or above the vehicle, wherein a cushion of air is interposed between the shoes and tracks so that rolling friction is entirely eliminated. However, in the latter case, known prior art constructions involve relatively high air pressures on the order of 100-200 p.s.i. exerted over small areas and in practice are operable only if the cooperating shoes and tracks exhibit a high degree of flatness and parallelism. Even if such conditions could be made to prevail uniformly throughout the long distances involved in the contemplated range of transportation, the power required to support practical vehicle is extremely high, owing to the fact that each of the high pressure air bearings covers a comparatively small area and therefore the shoes or pads must be profusely distributed between the vehicle and the supporting surface. Furthermore, such arrangements are very susceptible to total disablement or interruption of operation if debris collects on the rails, the probability of which is aggravated by the extreme distances involved.

As used hereinafter, the term low pressure air is intended to denote pressures up to approximately two atmospheres above ambient pressure.

It is an object of the present invention to provide an improved high speed land transportation system.

Another object is to provide a high speed land transportation system utilizing a continuous relatively smooth supporting surface along which a low pressure air bearing supported self-propelled vehicle is guided.

A further object is to provide an arrangement of the stated character wherein the continuous rail structure is in the form of a monorail of generally V-shaped cross section, the laterally opposite surfaces of which extend generally parallel to similarly inclined runners on the underside of the vehicle which are supported in spaced relation from the track surfaces by low pressure air bearing means having an effective bearing area nearly equal to the plan form area of the vehicle.

A still further object is to provide a structure of the stated character employing flexible plenum chamber type air bearings.

Still another object is to provide a vehicle of the type described including propulsion means for the vehicle and means for providing a continuous high volume low pressure air flow to the low pressure air bearing runner constructions.

A still further object is to provide a vehicle of the character described wherein both propulsion and support are derived from a single source of power.

The foregoing and other objects, advantages and features of the invention will be more fully apparent as reference is had to the accompanying specification and drawings wherein:

FIG. 1 is a perspective view, partly in section and with parts broken away, illustrating a track structure and train of vehicles according to the invention;

FIG. 2 is a front elevational view, partly in section, of the arrangement shown in FIG. 1, illustrating the runner structure and air bearings utilized in supporting the vehicle in frictionless spaced relation with the ground supported track;

FIG. 3 is a greatly enlarged perspective view, representing a transverse section midway through one of the runners, with parts broken away, illustrating details of construction of the air bearings;

FIG. 4 is a view looking in the direction of arrows 4—4 of FIG. 2;

Figure 5:
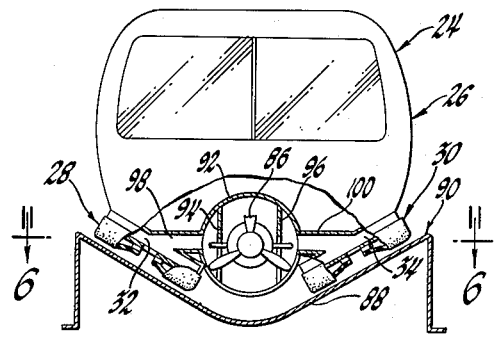
FIG. 5 is a view similar to FIG. 2 illustrating a modification of the invention.

Referring now to the drawings and particularly FIG. 1, there is illustrated a transportation system of the type wherein a train 2 of vehicles 4 are connected in trail for movement along a monorail structure 6. Monorail structure 6 is generally V-shaped in cross section and has laterally opposite walls providing reversely inclined supporting surfaces 8 and 10 which form a wedge-shaped trough along which the train of vehicles is propelled. For reasons shortly to be described, monorail 6 may be fabricated from relatively light gauge sheet metal and is therefore capable of tolerating a substantial amount of bending deflection which permits it to present a continuous unbroken surface, yet conform to terrain variation such as inclines and undulations. In addition, where relatively sharp turns are required, the rail is readily banked and turned by introducing gradual torsional deflection and lateral bending deflection. It will be understood that monorail 6 may either rest directly on the ground or be mounted on trestles or prepared road beds. In any case, the transverse midportion of the rail 6 is preferably provided with a depending trough 12 into which rain and other air borne debris landing on surfaces 8 and 10 will fall and thus tend to reduce the changes of such material collecting on the supporting surfaces 8 and 10. The side walls 14 and 16 of trough 12 are preferably provided with apertures 20 and 22 at spaced intervals to assure adequate rate of drainage in the event of heavy rainfall.

Each of the vehicles 4 of train 2 is in the form of a hull having an upper passenger or cargo compartment 24 and a lower supporting structure or undercarriage 26. Undercarriage 26 includes laterally spaced longitudinally extending inclined runner portions 28 and 30 which incorporate low pressure air bearings adapted to maintain the entire vehicle in spaced frictionless relation with the surfaces 8 and 10 of rail 6. As seen best in FIGS. 2 and 3, runner portions 28 and 30 include rigid rectangular box-like cavities 32 and 34 which communicate with a central chamber 36 beneath compartment 24 via ducts 38 and 40. Central chamber 36 in turn communicates with atmosphere through grills 42 and 44 at either side of the hull whereby air is drawn in from atmosphere by an engine driven single stage axial fan 46 and forced into cavities 32 and 34 through ducts 38 and 40. From cavities 32 and 34, low pressure high volume air passes downwardly through longitudinal slots 48 and 50 into the space between the lower walls 52 and 54 of runners 28 and 30 and the opposed surfaces 8 and 10 of rail 6. To achieve the maximum efficiency in terms of load supporting capability, the lower surfaces 52 and 54 have connected thereto flexible diaphragm elements 56 and 58, the outer edges of which are sealed to the periphery of runners 28 and 30. As seen best in FIG. 4, the central portion of diaphragms 56 and 58 are formed with relatively narrow rectangular openings 60 and 62 which register with slots 48 and 50. The boundary of each opening 60 and 62 is connected in vertically spaced relation from the bottom walls 52 and 54 of the runners by segmental spacers 64 and 66. Spacers 64 and 66 serve to maintain a fixed vertical interval between the boundary of rectangular openings 60 and 62 and slots 48 and 50 while allowing air emerging through slots 48 and 50 to enter both cavities 68 and 70 formed between diaphragms 56 and 58 and lower walls 52 and 54, respectively, and the plenum chambers 72 and 74 between diaphragms 56 and 58 and the respective supporting surfaces 8 and 10.

The plenum chamber air bearing construction just described conforms generally to that disclosed in copending application Serial No. 4,465, Mackie et al., entitled "Air Cushion Vehicle," filed January 25, 1960, and has been found to provide remarkably high efficiency in terms of the ratio of load supporting capability to horsepower expended. As seen in FIG. 2, each diaphragm 56 and 58 assumes a cross-sectional configuration wherein the respective boundary radii 76 and 78 define a rectangular perimetrical gap 80 of very small vertical dimension which bounds the generally wedge-shaped plenum chambers 72 and 74. The pressure of air within these plenum chambers, although only moderately above atmospheric pressure, is capable of supporting enormous loads due to the extremely large area over which the pressure is applied. Furthermore, because of the flexible conforming of the radii 76 and 78 with the surfaces 8 and 10, the air loss rate through gap 80 is extremely low and therefore very moderate horsepower is required to maintain the vehicle 4 in frictionless spaced relation relative to rail 6. In addition, unlike other known low pressure air bearings, the diaphragms 56 and 58 are capable of tolerating irregularities which may occur on the surfaces 8 and 10 either in the form of debris or as a result of malformation in the physical structure of the rail. Thus, even though the perimetrical gap 80 existing between the diaphragm radii and the supporting surfaces is of the order of two to four thousandths of an inch, the tolerance of the air bearings to obstacles is determined by the vertical distance between the lower surfaces 52, 54 of runners 28, 30 and the adjacent supporting surfaces 8 and 10.

In the embodiment shown in FIGS. 1 and 2, forward propulsion of the train of vehicles is accomplished by a jet reaction device 82 which is mounted on the upper surface 84 of the passenger compartment of one or more of the vehicles. In view of the virtual absence of mechanical friction, it will be evident that the train of vehicles will not only be capable of extremely high speeds, but in addition the power requirements for attaining such speeds will be correspondingly low in relation to vehicles supported by mechanical bearings. Hence, a single propulsion unit will in most cases be sufficient to propel a train of considerable length.

It is to be particularly noted that a transportation system according to the present invention not only eliminates many of the practical problems associated with air bearing supports, but in addition provides stability with respect to lateral sway. By comparison, lateral sway is easily excited in vehicles suspended on overhead monorails. This swaying tendency is not only exceedingly discomforting to the passengers of such vehicles, but is also virtually impossible to correct without resorting to an additional rail.

An even more important advantage of the present invention is the fact that the total load represented by the train of vehicles is uniformly distributed over an exceptionally large area and therefore allows utilization of light gauge rail material. Furthermore, it is feasible to construct transportation systems over land masses or surfaces of the type which offer insufficient support for conventional vehicles, as for example, arctic permafrost, deep permanent snow, swamps, and deserts. Obviously, where the supported load is distributed in terms of a few pounds or less per square inch, the firmness of the terrain is of considerably less significance than where vast loads are applied to the ground at localized areas.

Figure 6:
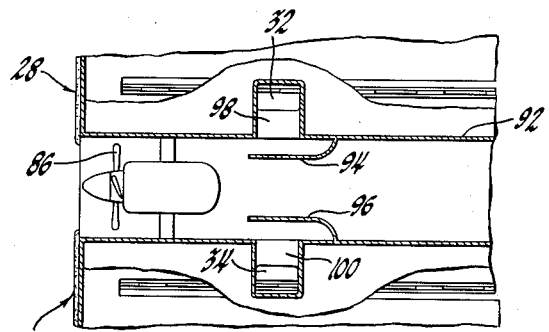
FIG. 6 is a view taken on line 6—6 of FIG. 5, illustrating certain details of construction of the arrangement shown in FIG. 5.

In FIGS. 5 and 6, there is shown a modification of the invention wherein both forward propulsion of the vehicle and the supply of low pressure air to the air bearings portion of runners 28 and 30 are accomplished by an engine driven large diameter single stage axial fan 86 which is mounted on supporting structure 26 and extends partially into the base portion 88 of a modified form of monorail track 90. As seen best in FIG. 6, a longitudinally extending cylindrical shroud 92 surrounding fan 86 is formed with laterally opposite baffles or scoops 94 and 96 which divert a portion of the large flow mass from fan 86 into ducts 98 and 100 and thence into cavities 32 and 34 of the air bearing structures, while the remainder of the mass flow produces the propulsive force for moving the vehicle.

Figure 7:
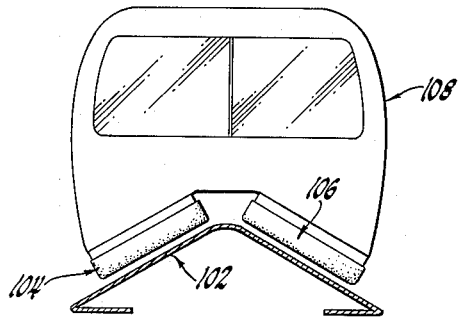
FIG. 7 is a view similar to FIG. 2, illustrating another modification of the invention.

FIG. 7 illustrates another modification of the invention wherein the monorail track 102 is fashioned in the form of an inverted V and the air bearing runners 104 and 106 of the vehicle 108 are inclined in directions opposite to those shown in FIGS. 2 and 5. From casual observation it will be apparent that the inverted V-track arrangement retains all of the desired stability offered by the upright V-track while providing additional advantages in terms of track strength and rigidity, inherent drainage, etc. Furthermore, a considerably lower seating level in the passenger compartment may be attained.

While several embodiments of the invention have been shown and described, it will be apparent that numerous changes, modifications and variations may be made therein. It is, therefore, to be understood that it is not intended to limit the invention to the embodiments shown, but only by the scope of the claims which follow.

We claim:

1. A rail transportation system comprising, a horizontally extending track of generally V-shaped cross section, a vehicle movable along said track, said vehicle including laterally spaced longitudinally extending runners arranged in inclined relation generally parallel with the V-shaped cross section of said track, fluid bearing means interposed between said track and each of said runners, means providing a continuous flow of fluid to said fluid bearings, and means providing a continuous flow of fluid for propelling the vehicle along said track.

2. A rail transportation system comprising, a horizontally extending track of generally V-shaped cross section, a vehicle movable along said track, said vehicle including an undercarriage having laterally spaced longitudinally extending runners arranged in inclined relation generally parallel with the V-shaped cross section of said track, low pressure air bearing means interposed between said track and each of said runners, means providing a continuous flow of air to said air bearings, and means providing a continuous flow of air for propelling the vehicle along said track.

3. A rail transportation system comprising, a horizontally extending track of generally V-shaped cross section, a wheelless vehicle movable along said track, said vehicle including an undercarriage having laterally spaced longitudinally extending runners arranged in inclined relation generally parallel with the V-shaped cross section of said track, low pressure air bearing means interposed between said track aand each of said runners, means providing a continuous flow of air to said air bearings, and means providing a continuous flow of air for propelling the vehicle along said track.

4. The structure set forth in claim 1 wherein the flow of fluid for said fluid bearing and for vehicle propulsion is derived from a single source.

5. The structure set forth in claim 4 wherein said single source is an engine driven large diameter ducted fan arranged on an axis extending longitudinally of the vehicle.

6. The structure set forth in claim 5 wherein said ducted fan is mounted on the lower surface of said vehicle between said runners.

7. A rail transportation system comprising, a monorail track of generally V-shaped cross section, a vehicle movable along said track, said vehicle including an upper passenger portion and a lower supporting portion having laterally spaced longitudinally extending runners arranged in inclined relation generally parallel with the V-shaped cross section of said track, means forming plenum chamber type air bearings on said runners between said track and said runners, an engine driven fan providing continuous flow of air to said air bearings, and a jet reaction device on said upper portion for propelling the vehicle along said track.

8. A rail transportation system comprising, a monorail track of generally V-shaped cross section, a vehicle movable along said track, said vehicle including laterally spaced longitudinally extending runners arranged in inclined relation generally parallel with the V-shaped cross section of said track, flexible plenum chamber air bearings mounted on said runners between said track and said runners, means providing continuous flow of air to said air bearings, and means providing continuous flow of air for propelling the vehicle along said track.

9. A rail transportation system comprising, a monorail track of generally V-shaped cross section, a vehicle movable along said track, said vehicle including laterally spaced longitudinally extending runners arranged in inclined relation generally parallel with the V-shaped cross section of said track, flexible plenum chamber air bearings mounted on said runners between said track and said runners, an axial flow fan providing continuous flow of air to said air bearings, and a jet reaction motor for propelling the vehicle along said track.

10. An air bearing supported vehicle comprising, a body portion, a supporting portion disposed beneath said body portion, a pair of laterally spaced longitudinally extending runners formed on said supporting portion and disposed in reversely similar inclined relation to a horizontal plane, each of said runners including a box-like rigid cavity having a longitudinal slot formed therein, air flow generating means carried by said supporting portion, means for directing air flow into said cavities, a flexible diaphragm disposed beneath each runner, each of said diaphragms having its outer periphery hermetically sealed to the perimeter of the adjacent runner, a longitudinal slot formed in said diaphragm aligned with said first mentioned slot, spacer means securing the portion of said diaphragm surrounding said last mentioned slot in vertically spaced relation from said runner, and passage means associated with said spacer means whereby air discharge from said cavities inflates the space between each runner and diaphragm and emerges through the slots in said diaphragms to form a vehicle supporting air pad below said diaphragms.

11. An air bearing supported vehicle comprising, a body portion, a supporting portion disposed beneath said body portion, a pair of laterally spaced longitudinally extending runners formed on said supporting portion and disposed in reversely similar inclined relation to a horizontal plane, each of said runners including a box-like rigid cavity extending the length of said vehicle, means forming a longitudinal slot centrally of the lower wall of said cavity, air flow generating means carried by said supporting portion, means for directing air flow into said cavity, a flexible diaphragm disposed beneath each runner, each of said diaphragms having its outer periphery hermetically sealed to the perimeter of the adjacent runner, a longitudinal slot formed in the central portion of said diaphragm vertically registered with said first mentioned slot, segmented spacers securing said central portion in vertically spaced relation from said runner, the gaps between said spacers forming passages through which air discharge from said cavities inflates the space between said runners and diaphragms and emerges through the slots in said diaphragms to form a vehicle supporting air pad below said diaphragms.

12. The structure set forth in claim 11 wherein the area of each diaphragm is greater than the area of the adjacent cavity lower wall whereby the diaphragm forms a depending lobe of rectangular pattern the lowermost level of which is substantially below the level of the spacer secured central portion.

13. A rail transportation system comprising, a monorail track of inverted V-shaped cross section, a vehicle movable along said track, said vehicle including laterally spaced longitudinally extending runners arranged in inclined relation generally parallel with the inverted V-shaped cross section of said track, low pressure air bearing means interposed between said track and each of said runners, means providing a continuous flow of air to said air bearings, and means providing a continuous flow of air for propelling the vehicle along said track.

14. A rail transportation system comprising, a monorail track of generally V-shaped cross section, a vehicle movable along said track, said vehicle including laterally spaced longitudinally extending runners arranged in inclined relation generally parallel with the V-shaped cross section of said track, low pressure air bearing means interposed between said track and each of said runners, means providing a continuous flow of air to said air bearings, and means for propelling the vehicle along said track.

References Cited in the file of this patent

UNITED STATES PATENTS

| | | |
|---|---|---|
| 1,000,009 | Jenison | Aug. 8, 1911 |
| 1,411,597 | Trask | Aug. 4, 1922 |
| 1,789,872 | Kruckenberg et al. | Jan. 20, 1931 |
| 1,961,753 | Fish | June 5, 1934 |
| 2,511,979 | Goddard | June 20, 1950 |
| 2,717,744 | Birnbaum | Sept. 13, 1955 |